May 13, 1924.

J. R. PORTER

AERONAUTICAL MACHINE

Filed Feb. 27, 1924

Inventor
J. R. Porter
by Wilkinson & Giusta
Attorneys.

May 13, 1924. 1,494,283
J. R. PORTER
AERONAUTICAL MACHINE
Filed Feb. 27, 1924 3 Sheets-Sheet 3

Inventor
J. R. Porter
by Wilkinson & Chusta
Attorneys.

Patented May 13, 1924.

1,494,283

UNITED STATES PATENT OFFICE.

JAMES ROBERTSON PORTER, OF CHRISTCHURCH, ENGLAND.

AERONAUTICAL MACHINE.

Application filed February 27, 1924. Serial No. 695,523.

*To all whom it may concern:*

Be it known that I, JAMES ROBERTSON PORTER, engineer, a subject of the King of Great Britain, of Stour Lodge, Stour Road, Christchurch, in the county of Hampshire, England, have invented a new and useful Improvement in or Relating to Aeronautical Machines, of which the following is a specification.

This invention has for its object to provide an improved aeronautical machine. In my previous Patent No. 1,440,242 I describe an aeronautical machine with a vertical axis for direct lifting, in which a current of air is caused to flow through a venturi-shaped channel, a central fuselage being fixed within the channel, and a series of radial passages provided, the passages forming means of access between an outside body and the central fuselage.

In the present invention I have embodied some of the features of the said type of machine and applied the same to a machine having a horizontal axis, one of the main features of difference being that the axis of the improved machine is curved or bent and in some cases the outer surface is of streamline form.

An aeronautical machine made in accordance with the present invention consists of a body having the principal cause of its resistance to motion removed by the provision of a longitudinal annular air channel surrounding a fuselage, the said body, the annular air channel and fuselage being constructed on a curved or bent axis so as to change the direction of the flow of the air current moving within the annular channel, the propeller being preferably fitted at or about the discharge end of the air channel. The body and fuselage may be of streamline formation and circular section.

The annular air channel may be provided with one or more radial passages extending from the fuselage to the outer body.

As described in my said prior patents the air channel may be in the form of a venturi shaped tube, which, when employed in the improved construction, has a curved or bent axis, which is also common to the fuselage and outer body.

The accompanying drawings show two constructions carried out in accordance with the present invention.

Figure 1:
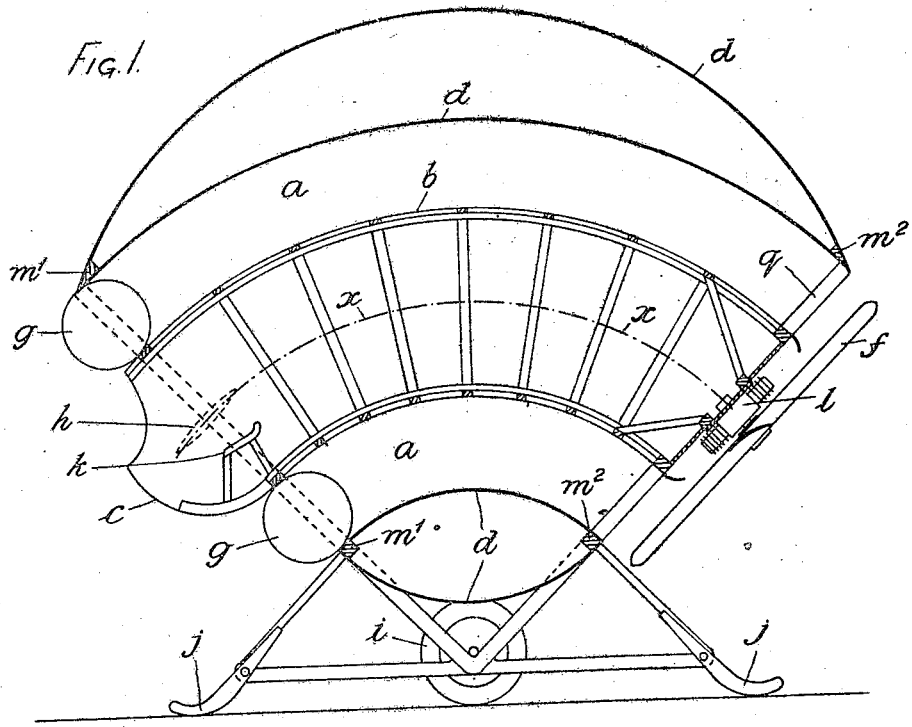
Fig. 1 is a vertical section of one construction applied to a machine intended for a nearly vertical ascent.
Figure 2:
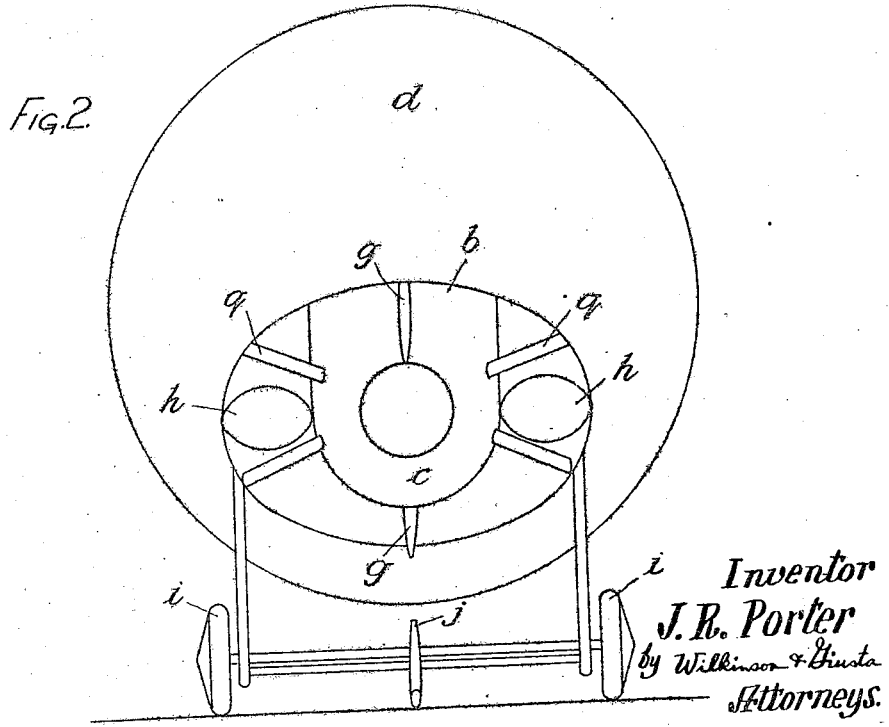
Fig. 2 is a front elevation of Fig. 1.

In the construction illustrated in Figs. 1 and 2, the machine is provided with an annular channel $a$, the axis $x$ of which, and of the machine generally, is curved so as to change the direction of the flow of the air current moving within the said annular channel $a$.

The annular channel $a$ surrounds a central fuselage $b$, and astern the machine is provided with a propeller $f$. Rudders $g$ and elevators $h$ are shown fitted in the front of the machine partly within the annular air channel $a$, but they may be fitted astern if desired.

The pilot's seat $k$ is located in the projecting nose $c$ of the central fuselage $b$, and the engine $l$ is mounted at the rear end of said fuselage so as to drive the propeller $f$.

The machine rises in the air in consequence of the curvature given to the annular air channel $a$ which causes the direction of the flow of air through the annular channel to be changed, thereby producing an upward reaction or lifting effect upon the machine.

Suitable launching devices such as wheels $i$ and skids or buffers $j$ are provided.

The interior space of the outer body $d\ d$ may be inflated with air under a slight pressure or preferably a gas lighter than air; in the latter case the gas used for inflation may be used for power purposes.

A suitable safety valve is provided at the base of the machine.

The inflatable outer body is shown as secured to front and back circular frames $m'\ m^2$.

Figure 3:
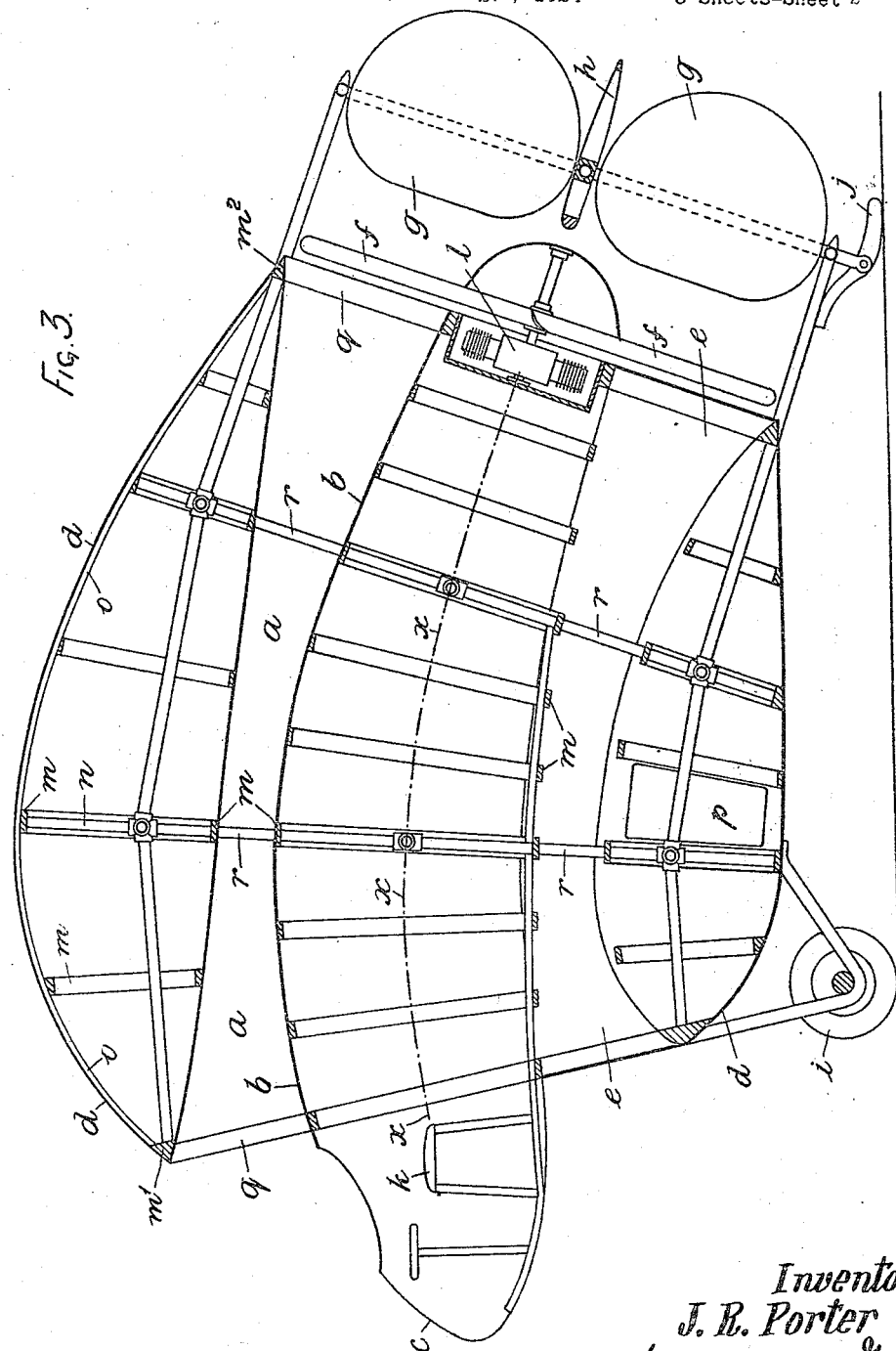
Fig. 3 is a vertical section of another construction for a more gradual ascent and horizontal flight.
Figure 4:
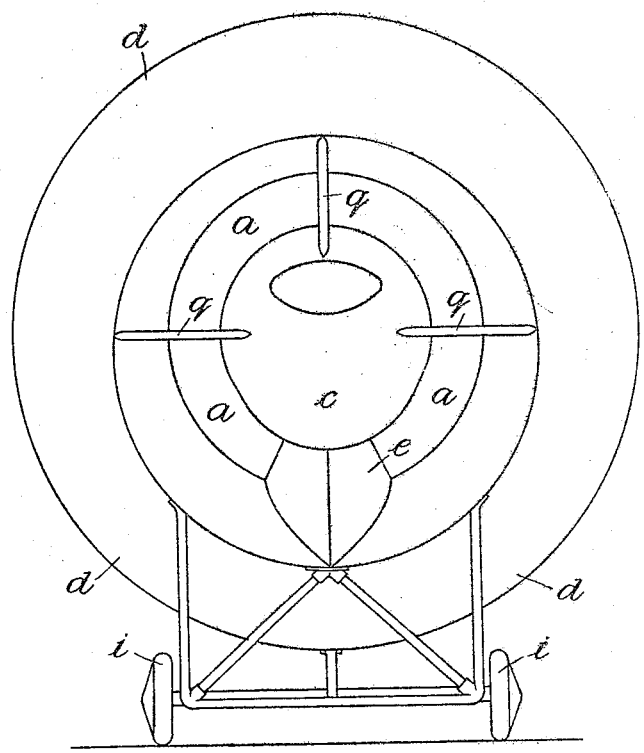
Fig. 4 is a front elevation of Fig. 3.

In the construction illustration in Figures 3 to 4 the machine generally may be looked upon as a streamline body having the principal cause of its resistance removed by a venturi air channel $a$, the axis $x$ of which and of the machine generally is curved so as to deflect the air downwards.

The central fuselage $b$ is very similar to that used in an aeroplane with the nose $c$ projecting in front of the main or outer body $d$ of the machine to which the said central fuselage is connected by a radial passage e, and astern the machine is provided with a propeller f, rudders g and elevators h. Towards the front a pair of wheels i are provided and a skid such as j may be fitted at the rear as in an aeroplane, or these landing devices may be dispensed with for flying boats.

The central fuselage b is of streamline formation, the curved surfaces of which and the surrounding Venturi tube or channel a and the radial passage e are shaped to follow the curved axis x of the machine, and in transverse section the fuselage b is substantially circular and the outer body d annular.

The pilot's seat k is located in the projecting nose c of the central fuselage b and the engine l is mounted in a recess at the rear end of the said fuselage so as to drive the propeller f which is located at or about the rear end of the venturi air channel and in front of the rudders g and elevators h.

Forward motion along the ground is produced in the same way as an aeroplane, and the machine rises into the air in consequence of the curvature given to the venturi air channel a, which causes the air to be driven downwards thereby producing an upward reaction. Although only one longitudinal radial passage e is shown a number of such may be employed as described, and for the purposes set forth in my aforesaid previous patent. The outer surface of the machine due to its curvature also tends to deflect the air in the same way as an aeroplane, and is an additional cause of lift. Upon the engine being started, and the machine held back, the machine receives an intial lifting effect due to the air being sucked through the curved venturi air channel a, such lifting effect being gradually increased as the machine advances.

The frame of the machine consists of rings m supported on radial arms n, the said rings being used to carry longitudinals o to which the surface material is attached.

A door p located in the lower portion of the outer body affords a means of access to the fuselage through the radial passage e.

The part of the venturi channel which has the most reduced sectional area is preferably located at a distance from the entrance of about one third of the length of the venturi.

In each construction at the inlet and exit of the annular channel, radial struts q q are provided which hold the circular rings m' m² to which the covering of the outer body is attached, and when required suitable frames such as r r, Fig. 3 are provided at intermediate points.

What I claim as my invention and desire to secure by Letters Patent is:—

1. An aeronautical machine consisting of a body having a longitudinal annular channel surrounding a fuselage, the said body, annular channel, and fuselage being constructed on a common curved axis.

2. An aeronautical machine consisting of a body having a longitudinal annular channel surrounding a fuselage, the said body, annular channel, and fuselage being constructed on a common bent axis.

3. An aeronautical machine consisting of a body having a longitudinal venturi shaped annular channel surrounding a fuselage, the said body, annular channel, and fuselage being constructed on a common curved axis.

4. An aeronautical machine consisting of a body having a longitudinal annular channel surrounding a fuselage, the said body annular channel and fuselage being of streamline formation and constructed on a common curved axis.

5. An aeronautical machine consisting of a body having a longitudinal venturi shaped annular channel surrounding a fuselage, the said body, venturi shaped annular channel and fuselage being of streamline formation and constructed on a common curved axis.

6. An aeronautical machine consisting of a body having a longitudinal annular channel surrounding a fuselage, the said body, annular channel and fuselage being constructed on a common curved axis, at least one radial passage being provided leading from the fuselage to the outer body.

7. An aeronautical machine consisting of a body having a longitudinal venturi shaped annular channel surrounding a fuselage, the said body, venturi shaped annular channel and fuselage being constructed on a common curved axis whilst at least one radial passage is provided leading from the fuselage to the outer body.

8. An aeronautical machine consisting of a body having a longitudinal annular channel surrounding a fuselage, the said body, annular channel, and fuselage being of streamline formation and constructed on a common curved axis, whilst at least one radial passage is provided leading from the fuselage to the outer body.

9. An aeronautical machine consisting of a body having a longitudinal venturi shaped annular channel surrounding a fuselage, the said body, venturi shaped annular channel and fuselage being of streamline formation and constructed on a common curved axis, whilst at least one radial passage is provided leading from the fuselage to the outer body.

10. An aeronautical machine consisting of an inflated body having a longitudinal annular channel surrounding a fuselage the nose of which projects in front of the said inflated body, the said inflated body, annular channel and fuselage being constructed on a common curved axis and the machine fitted astern with a propeller, rudders and elevators, suitable wheels and landing devices being provided.

11. An aeronautical machine consisting of an inflated body having a longitudinal venturi shaped annular channel surrounding a fuselage, the nose of which projects in front of the said inflated body, the said inflated body, venturi shaped annular channel and fuselage being constructed on a common curved axis and the machine fitted astern with a propeller, rudders and elevators suitable wheels and landing devices being provided.

12. An aeronautical machine consisting of an inflated body having a longitudinal annular channel surrounding a fuselage, the said inflated body, annular channel and fuselage being of streamline formation and constructed on a common curved axis whilst the machine is fitted astern with a propeller, rudders and elevators, suitable wheels and landing devices being provided.

13. An aeronautical machine consisting of an inflated body having a longitudinal venturi shaped annular channel surrounding a fuselage, the said inflated body, venturi shaped annular channel, and fuselage being of streamline form and constructed on a common curved axis.

14. An aeronautical machine consisting of an inflated body having a longitudinal venturi shaped annular channel surrounding a fuselage, the said inflated body, venturi shaped annular channel, and fuselage being of streamline form and constructed on a common curved axis, at least one radial passage being provided leading from the fuselage to the outer body.

15. An aeronautical machine consisting of a body having a longitudinal annular channel surrounding a fuselage the nose of which projects in front of the said body, the said body, annular channel and fuselage being constructed on a common curved axis, the machine being fitted astern with propellers, rudders and elevators, and provided with wheels and landing devices.

16. An aeronautical machine consisting of a body having a longitudinal venturi shaped annular channel surrounding a fuselage, the said body, venturi shaped annular channel and fuselage being constructed on a common axis whilst astern the machine is provided with a propeller rudders and elevators, suitable wheels and landing devices being fitted.

17. An aeronautical machine consisting of a body having a longitudinal venturi shaped annular channel surrounding a fuselage, the body, venturi shaped annular channel, and fuselage being of streamline form and constructed on a common axis whilst astern the machine is provided with a propeller, rudders and elevators, suitable wheels and landing devices being fitted.

18. An aeronautical machine consisting of a body having a longitudinal venturi shaped annular channel surrounding a fuselage, the body, venturi shaped annular channel, and fuselage being of streamline formation and constructed on a common axis, at least one radial passage being provided leading from the fuselage to the outer body whilst astern the machine is provided with a propeller, rudders, and elevators, suitable wheels and landing devices being fitted.

JAMES ROBERTSON PORTER.